United States Patent
Jaisinghani et al.

(10) Patent No.: US 9,350,738 B2
(45) Date of Patent: *May 24, 2016

(54) TEMPLATE REPRESENTATION OF SECURITY RESOURCES

(71) Applicant: Amazon Technologies, Inc., Seattle, WA (US)

(72) Inventors: Avinash Jaisinghani, Seattle, WA (US); Reto Kramer, Sammamish, WA (US); Christopher Whitaker, Sammamish, WA (US); Venkates P. Balakrishnan, Seattle, WA (US); Prashant Jayaraman, Bothell, WA (US); Richard Curtis Edwards, Jr., Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/611,933

(22) Filed: Feb. 2, 2015

(65) Prior Publication Data

US 2015/0150081 A1    May 28, 2015

Related U.S. Application Data

(63) Continuation of application No. 13/424,143, filed on Mar. 19, 2012, now Pat. No. 8,949,930.

(51) Int. Cl.
*H04L 29/06* (2006.01)
*H04L 12/24* (2006.01)

(52) U.S. Cl.
CPC ............ *H04L 63/10* (2013.01); *H04L 41/0806* (2013.01); *H04L 63/06* (2013.01); *H04L 63/0823* (2013.01); *H04L 63/102* (2013.01); *H04L 63/20* (2013.01)

(58) Field of Classification Search
CPC ..... H04L 63/0281; H04L 63/10; H04L 63/20; H04L 63/0884
USPC ........ 726/1–3, 16–17, 21; 713/155, 159, 172; 380/229, 250
See application file for complete search history.

(56) References Cited

U.S. PATENT DOCUMENTS

| | | |
|---|---|---|
| 6,766,364 B2 | 7/2004 | Moyer et al. |
| 7,246,200 B1 | 7/2007 | van Rietschote et al. |

(Continued)

FOREIGN PATENT DOCUMENTS

| | | |
|---|---|---|
| JP | 2004086769 | 3/2004 |
| JP | 2005056201 | 3/2005 |

(Continued)

OTHER PUBLICATIONS

Gunter Karjoth, Access Control with IBM Tivoli Access Manager, May 2003, ACM, vol. 6 Issue 2, pp. 232-257.*

(Continued)

*Primary Examiner* — Bradley Holder
*Assistant Examiner* — Fahimeh Mohammadi
(74) *Attorney, Agent, or Firm* — Robert C. Kowert; Meyertons, Hood, Kivlin, Kowert & Goetzel, P.C.

(57) ABSTRACT

Systems and methods are described for enabling users to model security resources and user access keys as resources in a template language. The template can be used to create and update a stack of resources that will provide a network-accessible service. The security resources and access keys can be referred to in the template during both stack creation process and the stack update process. The security resources can include users, groups and policies. Additionally, users can refer to access keys in the template as dynamic parameters without any need to refer to the access keys in plaintext. The system securely stores access keys within the system and allows for templates to refer to them once defined. These key references can then be passed within a template to resources that need them as well as passing them on securely to resources like server instances through the use of the user-data field.

14 Claims, 6 Drawing Sheets

(56) References Cited

U.S. PATENT DOCUMENTS

| | | | |
|---|---|---|---|
| 7,290,164 | B1 | 10/2007 | Harvey et al. |
| 7,457,853 | B1 | 11/2008 | Chari et al. |
| 7,844,903 | B2 | 11/2010 | Dawkins et al. |
| 7,873,960 | B2 | 1/2011 | Templin et al. |
| 8,326,658 | B1 | 12/2012 | Lee et al. |
| 8,331,362 | B2* | 12/2012 | Shukla ............... H04L 41/0843 370/389 |
| 8,484,355 | B1* | 7/2013 | Lochhead ............ H04L 41/0806 709/222 |
| 8,825,817 | B1 | 9/2014 | Jaisinghani et al. |
| 2002/0087734 | A1 | 7/2002 | Marshall et al. |
| 2003/0126195 | A1* | 7/2003 | Reynolds ................ G06F 1/14 709/203 |
| 2005/0021688 | A1 | 1/2005 | Felts et al. |
| 2006/0050862 | A1 | 3/2006 | Shen et al. |
| 2006/0075102 | A1 | 4/2006 | Cupit |
| 2006/0195575 | A1* | 8/2006 | Delany ................. G06F 21/41 709/225 |
| 2007/0016897 | A1 | 1/2007 | Todd |
| 2007/0112574 | A1 | 5/2007 | Greene |
| 2007/0260712 | A1 | 11/2007 | Jibbe |
| 2008/0147675 | A1* | 6/2008 | Engehausen ............. G06F 8/60 |
| 2008/0163171 | A1 | 7/2008 | Chess et al. |
| 2008/0288239 | A1 | 11/2008 | Bailey et al. |
| 2009/0064135 | A1 | 3/2009 | Jimmerson |
| 2009/0077090 | A1* | 3/2009 | Pacifici ................ G06F 9/5038 |
| 2009/0217287 | A1 | 8/2009 | Blum et al. |
| 2010/0005529 | A1 | 1/2010 | Hemade |
| 2010/0023934 | A1 | 1/2010 | Sheehan et al. |
| 2010/0037287 | A1 | 2/2010 | Netrakanti et al. |
| 2010/0050173 | A1 | 2/2010 | Hensbergen |
| 2010/0131324 | A1 | 5/2010 | Ferris |
| 2010/0131624 | A1 | 5/2010 | Ferris |
| 2010/0131625 | A1 | 5/2010 | Dehaan et al. |
| 2010/0154024 | A1* | 6/2010 | Boxmeyer ............. G06F 21/85 726/1 |
| 2010/0165876 | A1* | 7/2010 | Shukla ................ H04L 41/0806 370/254 |
| 2010/0318658 | A1 | 12/2010 | Zorn et al. |
| 2011/0138047 | A1 | 6/2011 | Brown et al. |
| 2011/0225467 | A1 | 9/2011 | Betzler et al. |
| 2011/0258621 | A1 | 10/2011 | Kern |
| 2011/0296020 | A1 | 12/2011 | Deng et al. |
| 2011/0320574 | A1 | 12/2011 | Felts |
| 2011/0320605 | A1 | 12/2011 | Kramer et al. |
| 2012/0147894 | A1 | 6/2012 | Mulligan et al. |
| 2012/0179808 | A1 | 7/2012 | Bergkvist et al. |
| 2012/0233333 | A1 | 9/2012 | Ganesan et al. |
| 2012/0246630 | A1 | 9/2012 | Kuzins et al. |
| 2013/0097651 | A1* | 4/2013 | Rendahl ................ G06F 21/33 726/1 |
| 2013/0124807 | A1 | 5/2013 | Nielsen et al. |
| 2013/0167211 | A1 | 6/2013 | Kamat |
| 2013/0212183 | A1 | 8/2013 | Ward |
| 2013/0232480 | A1 | 9/2013 | Winterfeldt et al. |
| 2013/0232498 | A1 | 9/2013 | Mangtani et al. |
| 2013/0283273 | A1 | 10/2013 | Miyazaki |

FOREIGN PATENT DOCUMENTS

| | | |
|---|---|---|
| JP | 2005266917 | 9/2005 |
| JP | 2007193696 | 8/2007 |
| JP | 2009217321 | 9/2009 |
| JP | 2010140403 | 6/2010 |
| JP | 2012501021 | 1/2012 |
| WO | 2010023139 | 3/2010 |

OTHER PUBLICATIONS

Jaap-Henk Hoepman et al., Crossing Borders: Security and Privacy Issues of the European e-Passport, Jun. 30, 2006, Springer-Verlag, pp. 152-167.*

Chris Roberts, Biometric attack vectors and defences, Feb. 2007, ScienceDirect, vol. 26, Issue 1, pp. 14-25.*

A. Lin et al., The application of security policy to role-based access control and the common data security architecture, Nov. 1, 2000, ScienceDirect, vol. 23, Issue 17, pp. 1584-1593.*

U.S. Appl. No. 14/473,037, filed Aug. 29, 2014, Avinash Jaisinghani.

AWS Cloudformation user guide, api version May 15, 2010, pp. 1-468 (2013).

U.S. Appl. No. 13/424,143, filed Mar. 19, 2012, Avinash Jaisinghani.

U.S. Appl. No. 13/424,160, filed Mar. 19, 2012, Reto Kramer.

U.S. Appl. No. 12/824,723, filed Jun. 28, 2010, Reto Kramer.

Cloud Computing. Delivered., RightScale Inc., Retrieved on May 7, 2010 at <<http://www.rightscale.com/>>, pp. 1-7.

"Open Virtualization Format", VMware Inc., Retrieved on May 7, 2010 at <<http://www.vmware.com/appliances/getting-started/learn/ovf.html>>, pp. 1-6.

Anil Jain et al., Biometric template security, Jan. 2008, ACM, vol. 2008, pp. 1-17.

Sascha Konrad et al., Using Security Patterns to Model and Analyze Security Requirements, 2003, Michigan State University, pp. 1-10.

Ankur Taly et al., Automated Analysis of Security-Critical JavaScript APIs, May 22-25, 2011, IEEE, pp. 363-378.

Komathy K. et al., Component-based Security Model for XML Messaging Services, Nov. 6-8, 2002, IEEE, pp. 132-133.

"Architecture for Managing Clouds; A White Paper from the Open Cloud Standards Incubator", DMTF Informational, Jun. 18, 2010, pp. 1-57.

* cited by examiner

TEMPLATE REPRESENTATION OF SECURITY RESOURCES

This application is a continuation of U.S. patent application Ser. No. 13/424,143, filed Mar. 19, 2012, now U.S. Pat. No. 8,949,930, which is hereby incorporated by reference in its entirety.

BACKGROUND

In the context of computer networking, web services and other computing services provide a way to access software functionality that can be reused for a variety of purposes by different clients. In recent years, numerous service providers have emerged which provide technologies that deliver computation, software, data access, and storage services that do not require end-user knowledge of the physical location and configuration of the system that delivers those services. Ordinarily, such network-accessible service providers deliver applications via the internet as a metered service on behalf of an owner of the application. These applications are typically accessed from web browsers, desktop and mobile apps by various end users, while the business software and data are stored on servers at a remote location that is managed by the service provider. In this manner, the owner of the application is relieved of the burden of having to build and maintain the various hardware and software infrastructure needed to run their application(s). In turn, this can cut down on costs and maintenance, improve reliability and scalability, and provide enhanced agility (time-to-market) for deploying new applications.

In this network-accessible service environment, security and identity management have become topics of some attention. For example, it is desirable for clients of the service provider to securely control access to their network-accessible services and resources. They often need to create and manage users on the system, and grant access to various resources for users managed outside of the system, such as users in their own corporate directory. Furthermore, it may be tedious and inconvenient for clients to manually perform all of the security management and a more automated approach is desirable.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with the embodiments described herein overcome the various deficiencies in existing approaches for security and identity management in software. In particular, the various embodiments provide approaches for representing security resources in templates on system that provides network accessible services.

In accordance with various embodiments, systems and methods are described for enabling users to model security resources and user access keys as resources in a template language. The template can then be used to create and update a stack of resources that will provide a network-accessible service. In accordance with an embodiment, the security resources and access keys can be referred to in the template during both stack creation process and the stack update process. In accordance with an embodiment, security resources can include users, groups and policies. The user can refer to access keys in the template as dynamic parameters without any need to refer to the access keys in plaintext.

In accordance with an embodiment, the system securely stores access keys within the system and allows for templates to refer to them once defined. These key references can then be passed within a template to resources that need them as well as passing them on securely to resources like server instances through the use of the user-data field.

A client of a network-accessible service provider is thus enabled to create a user, setup appropriate policies, create an access key id and secret key pair within the template and then flow the credential material to the compute node or server instance, all declaratively from within the template. Additionally, by using these features, a user can be created whose existence is associated with the stack and is tied to the lifetime of the stack, thereby enabling each stack of resources to have their own unique and separate users.

In accordance with an embodiment, a stack is a set of resources on a network-accessible services provider, running together as a single unit. The stack can provide at least one network-accessible service (e.g. an application) to various clients and can include such resources as compute nodes (e.g. virtual machines, virtual server instances), databases, front-end machines, middleware (e.g. application servers, web servers, etc.), security modules, load balancers, queues, topics, subscriptions and others. In accordance with an embodiment, the resources of the stack are bundled together in a single definition and operate as a single unit to enable the network-accessible service. For example, a user that wishes to deploy a web application may create a stack that is comprised of a database, several compute node instances and a front end interface. The stack can be created and managed for the user on a network-accessible service provider that provides access to the stack for end users over a network such as the Internet. As used throughout this disclosure, the terms "network accessible service provider," or "service provider" are used interchangeably and are intended to mean any operator, system or other entity that provides and/or manages a set of services (e.g. applications, web sites, databases, etc.) on behalf of the clients or users of the provider.

Figure 1:
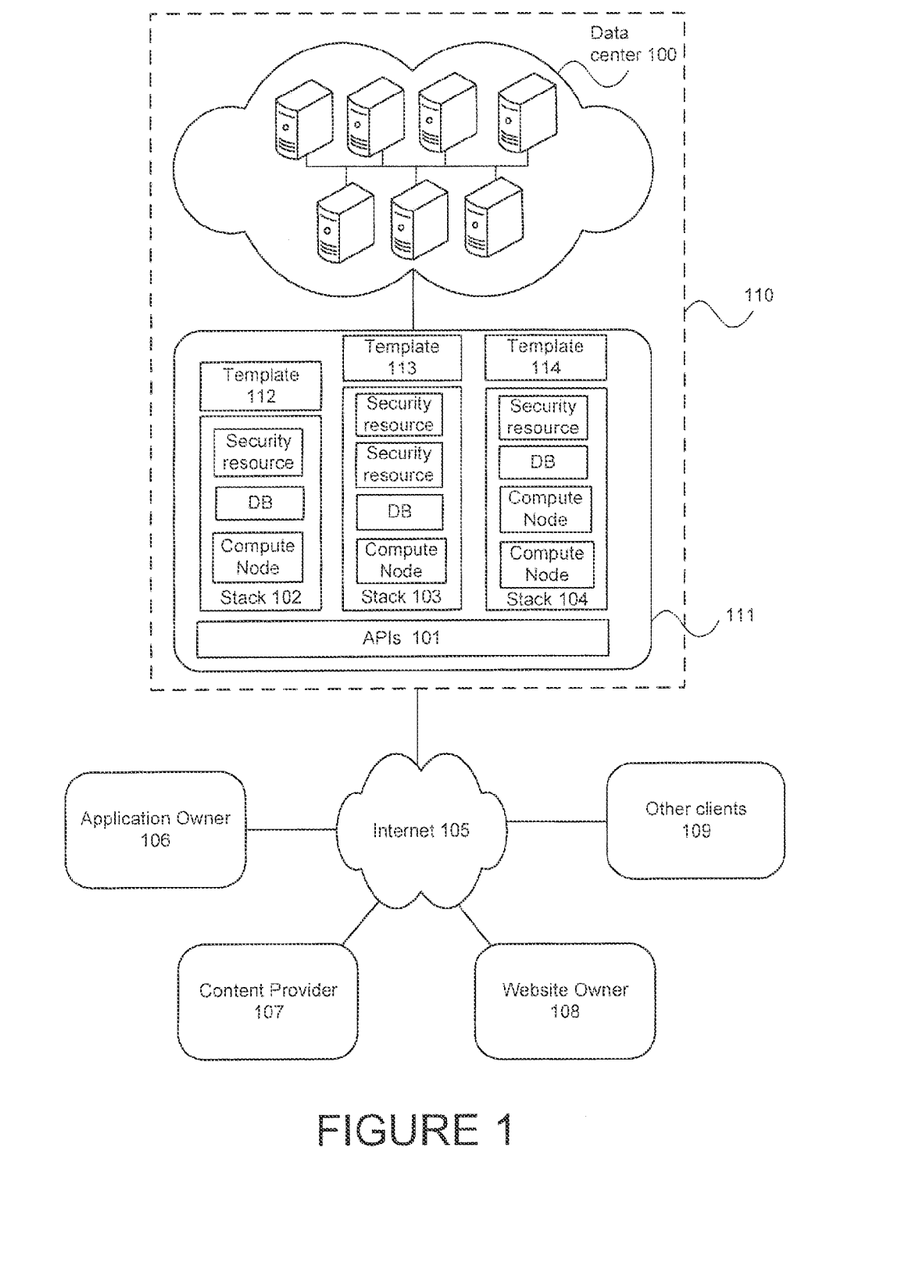
FIG. 1 is an illustration of a system environment that utilizes stacks of resources to provide a network-accessible service, in accordance with various embodiments.

FIG. 1 is an illustration of a system environment that utilizes stacks of resources to provide a network-accessible service, in accordance with various embodiments. As illustrated, a network-accessible service provider 110 can maintain a physical data center 100 that includes the various computer servers, data storage machines, network devices and other hardware resources necessary to provide the various network accessible services on behalf of the clients (106, 107, 108, 109) of the provider. In accordance with an embodiment, the service provider can expose its application programming interfaces (APIs) 101 to those clients in order to enable the clients to create, maintain and manage the resource stacks that can be used to run the services and applications over the Internet 105.

In accordance with an embodiment, each stack (102, 103, 104) represents a collection of resources needed to run the particular application or service. The resources can include server instances or compute nodes, databases, load balancers, notification service topics and subscriptions, security users, groups and policies, domain name system (DNS) records, elastic internet protocol (IP) addresses and various others. For example, a compute node can be a virtual machine that is created and managed by a service provider on behalf of its customer in order to meter the customer's application and its usage of the service provider's resources. In accordance with an embodiment, the compute node can be implemented as hardware, software or combination thereof, and can be associated with a particular computing capacity, storage capacity, cost per usage and the like. A database instance can be a resource for storing data that can be accessed by the compute node (i.e. server instance). An elastic IP address resource can be implemented as a reference that represents an IP address that can be moved from being assigned to one resource to being assigned to another resource.

In accordance with an embodiment, a resource (e.g. compute node, database, etc.) can be a virtual resource (e.g. a virtual compute node instance, a virtual database instance, etc.) created and managed by the service provider in order to meter the usage and charges for running the application on behalf of the client. Alternatively, the resource can be mapped to actual physical components (e.g. actual computer server, etc.).

In accordance with an embodiment, each stack is associated with a template (112, 113, 114). A template can be implemented as a Javascript Object Notation (JSON) formatted text file that describes the resources needed to execute an application or service along with any inter-connection between them. Templates concisely capture resource relationships, such as the server instances that must be associated with a load balancer. The template can be parameterized to enable a single template to be used for many infrastructure deployments that have different configuration values, such as how many instances to spin up for the application. Templates can also provide output properties that can be used to easily communicate configuration or the results of deploying the template back to the user. For example, when instantiated, a template may provide the uniform resource locator (URL) of the load balancer endpoint that the client should use to connect to the newly instantiated application. In accordance with one embodiment, all resources in a template are identified using logical names, allowing multiple stacks to be created from a template without fear of naming collisions between resources.

In accordance with an embodiment, the template can be provided by the client using a console, a command line tool, an application programming interface (API), or any other means known in the art. Templates can be used to both create a resource stack, as well as update the resource stack when changes are needed.

In accordance with an embodiment, a stack (102, 103, 104) is the collection of resources that result from instantiating a template. A stack is created by supplying a template and any required parameters to the service formation system. Based on the template, the system determines what resources need to be created and in what order. The order can be determined by the dependencies specified between the resources declared in the template. Some of these dependencies are implicit, where a relationship between the resources implies a dependency. In other cases, the dependency is explicit, where the template author can define a dependency between the resources, ensuring one is created before the other.

In accordance with an embodiment, stacks can be created, updated and deleted using the service formation system 111. During stack creation, the system 111 can record the mapping from the logical name given in the template (e.g. 'myServer') to the actual name of the resource that is instantiated (e.g. instance name 'i-19d3ac161'). The stack creation status and resource name mappings can be made available via the API 101.

Figure 2:
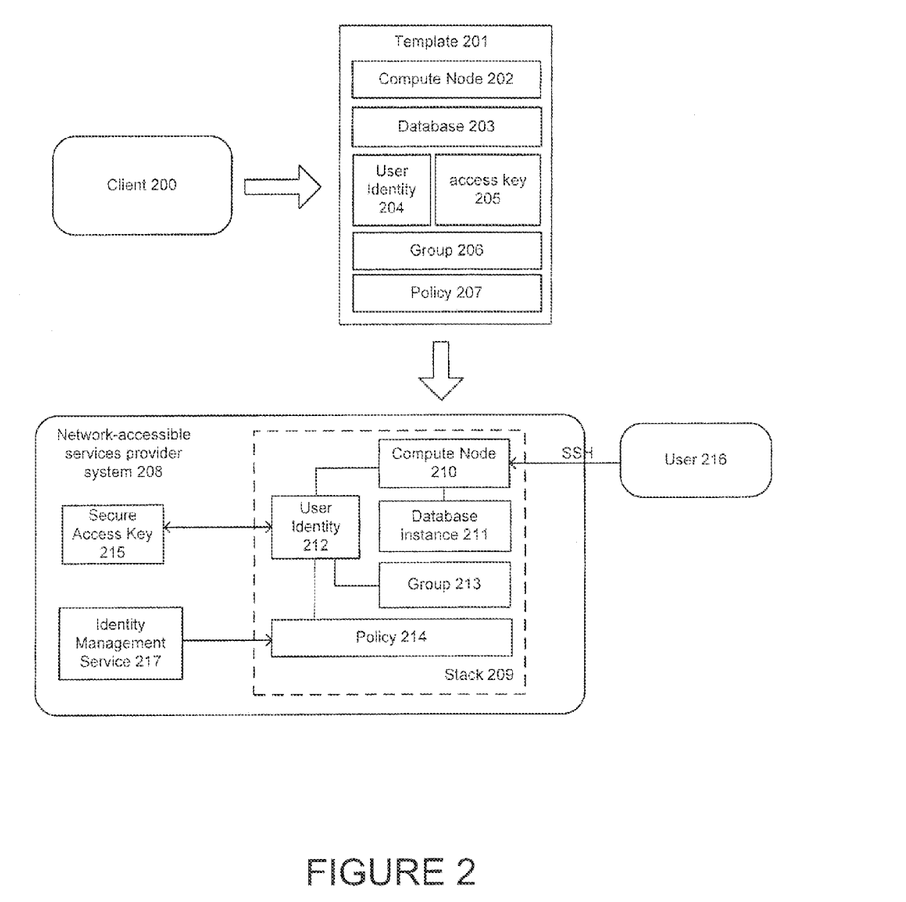
FIG. 2 is an illustration of using a template that includes security resources to create a stack, in accordance with various embodiments.

FIG. 2 is an illustration of using a template that includes security resources to create a stack, in accordance with various embodiments. As illustrated, the client 200 can provide a template 201 to the network-accessible service provider system 208. For example, client 200 may be an owner of a web application and desires to run that application on the service provider's system 208 in order to avoid having to build the necessary hardware infrastructure needed to run the web application. The client can thus provide a template 201 that will be used to create the stack of resources 209 that will run the web application on the service provider's infrastructure.

When the system receives the template 201, it can parse it and determine the various resources that will need to be created to run the application and the relationships and dependencies between those resources. In the illustrated example, the template specifies that this particular stack will include a compute node 202, a database 203, a user 204, a group 206 and a policy 207. Based on this template, the system 208 will create the stack 209 of resources. As part of this process, the system will instantiate a compute node instance 210 and a database instance 211 that will together provide the network-accessible service. In addition, the system will create a user (e.g. a customer identity for the application owner or other user) 212, cause a policy 214 to be created that gives specific permissions to which actions the user is allowed to (and not allowed to) perform and attach that policy to the user. For example, the client owner of the application may wish to implement the application in such a way that only a certain user 216 can connect to the compute node 210 and perform various actions thereon. In accordance with an embodiment, the service provider can call an identity management service 217 that creates the policy on behalf of the system used to create the stack of resources. For example, the identity management service can be a separate service that manages the user identities, groups and policies for the application owners and customers of the service provider. In alternative embodiments, the service provider system 208 can create the policy on its own or obtain it from other entities or services.

In accordance with an embodiment, the system also enables a client to opaquely reference the access key of the user by referring to the "user access key" attribute 205 rather than actually specifying the access key as a string in the template. This provides an added security advantage in that the actual string value of the access key is hidden from anyone viewing the template. Because the system 208 creates the user 212 and the access key 215 for that user internally, it can refer to it as an attribute rather than needing to specify the key explicitly. When the system detects, in the template, a parameter that opaquely references the access key by referring to an attribute of the user, it can determine the resources which are instructed to receive the access key and securely provide the access key to those resources. In accordance with various embodiments, the resources that receive the key in such a fashion can be part of the stack, a different stack or can be external to the system.

Figure 3:
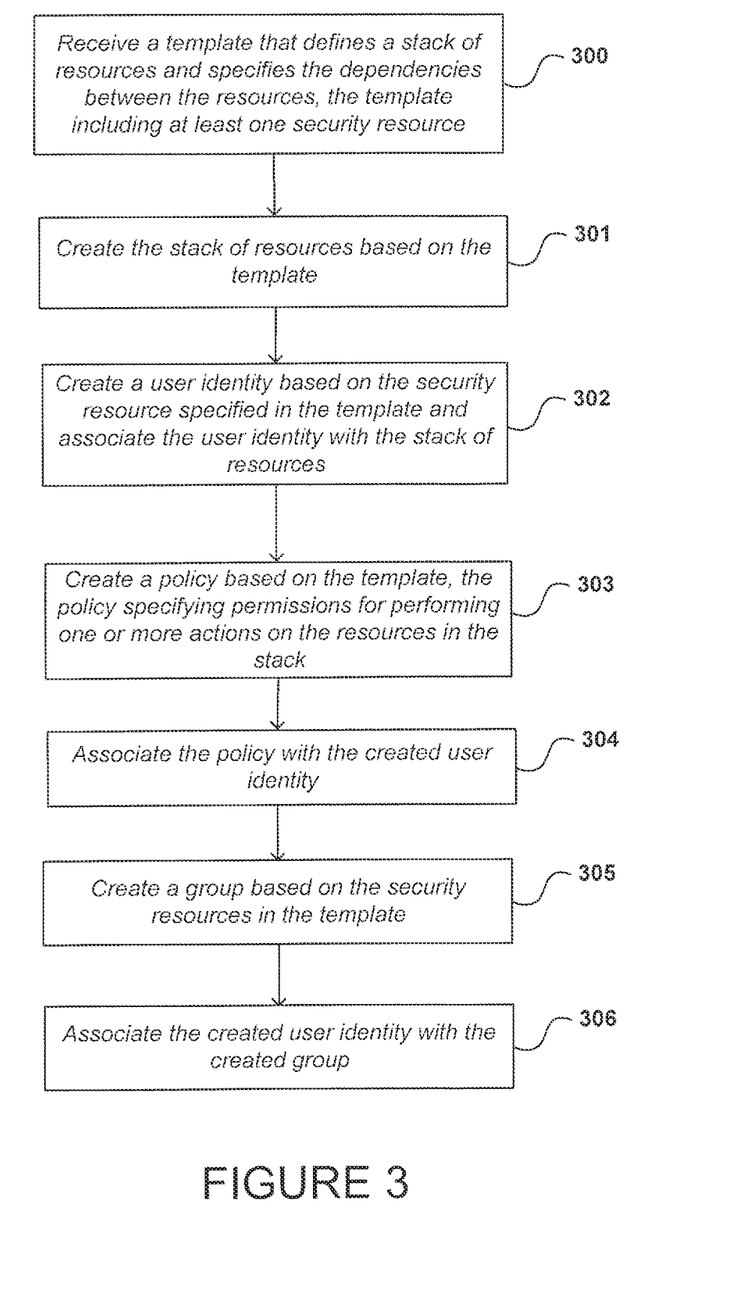
FIG. 3 illustrates an example process for using security resources in a template to create a stack, in accordance with various embodiments.

FIG. 3 illustrates an example process for using security resources in a template to create a stack, in accordance with various embodiments. Although this figure, as well as any other process illustrations contained in this disclosure may depict functional steps in a particular sequence, the processes are not necessarily limited to the particular order or steps illustrated. One skilled in the art will appreciate that the various steps portrayed in this or other figures can be changed, rearranged, performed in parallel or adapted in various ways. Furthermore, it is to be understood that certain steps or sequences of steps can be added to or omitted from the process, without departing from the scope of the various embodiments.

As shown in step 300, the system can receive a template that defines a stack of resources and specifies the dependencies between the resources. In accordance with an embodiment, the template can include one or more security resources. For example, the security resource can be a user, a group or a policy specified in the template.

In step 301, the system parses the template and uses the information contained therein to create a stack of resources. This stack of resources will run the application that provides a network-accessible service desired by the client of the service provider. For example, the stack of resources can include a compute node that executes the application and a database instance that stores data processed by the compute node.

In step 302, the system creates a user (e.g. customer identity, user identity) based on the security resources and relationships specified in the template. In accordance with an embodiment, the creation of the user identity can be performed as part of creating the stack of resources. Alternatively, the creation of the user identity can be performed before or after the stack of resources has been created.

In step 303, the system can create a policy based on the security resources and relationships specified in the template. In accordance with an embodiment, the policy specifies permissions for performing one or more actions on the resources in the stack or some other resources. For example, the policy may specify that any user attached to this policy can log into the compute nodes of the stack.

In step 304, the system can associate the policy with the user identity based on the security resources and relationships indicated in the template. Once the policy is attached in this manner, the user will be allowed to perform the actions specified in the policy and will be precluded from performing the actions which are not permitted by the policy.

In step 305, the system can create a group based on the security resources and relationships specified in the template. In accordance with an embodiment, a group is a construct to associate a plurality of users. A group can also be associated with a policy, whereby the users belonging to that group will be permitted to perform the actions specified in that policy.

In step 306, the system associates the created user identity with the group based on the security resources and their relationships specified in the template.

Figure 4:
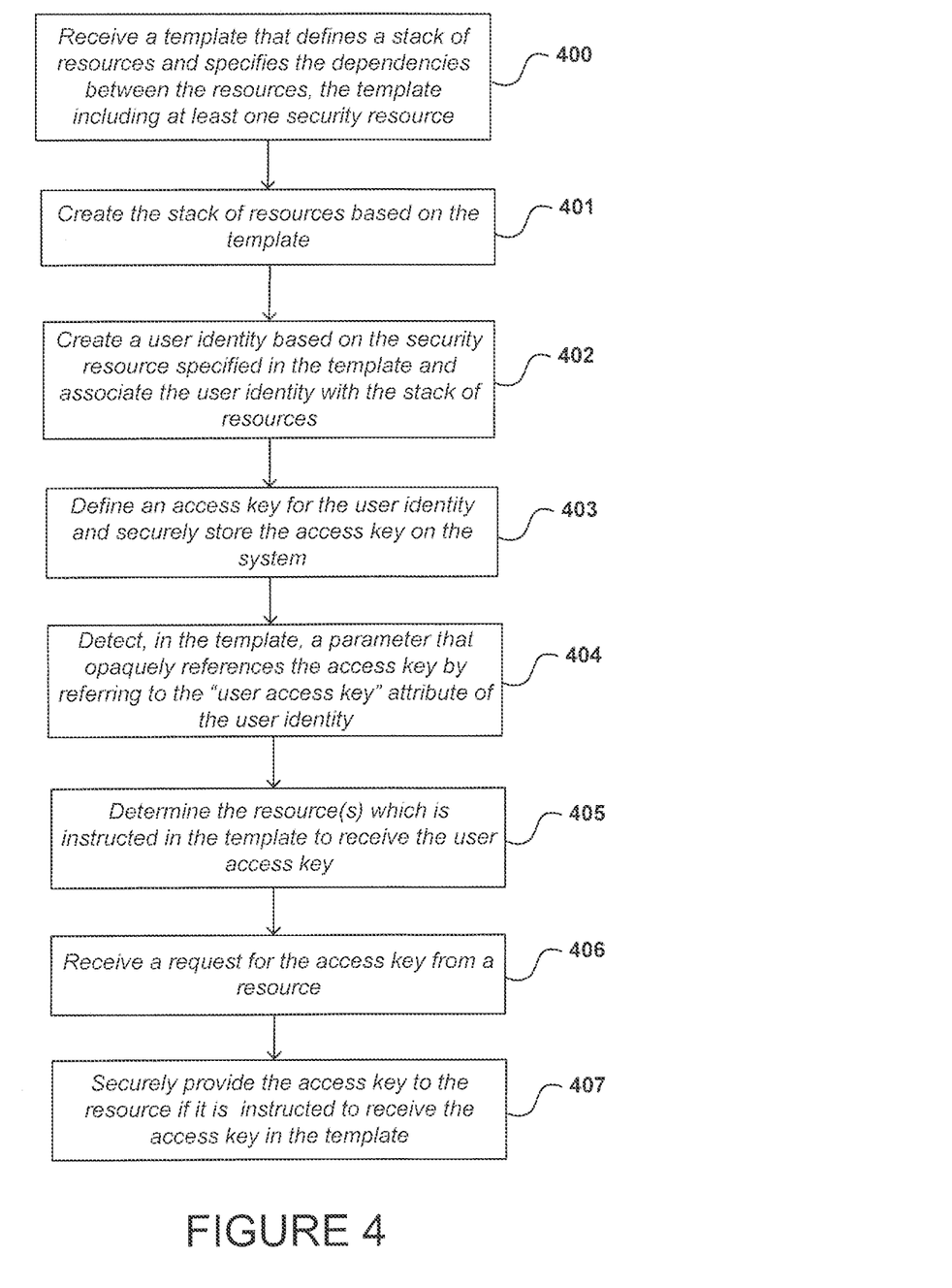
FIG. 4 illustrates an example process for referring to user access keys in a template, in accordance with various embodiments.

FIG. 4 illustrates an example process for referring to user access keys in a template, in accordance with various embodiments.

In steps 400 and 401, the system receives a template and creates a stack of resources as previously described in FIG. 3. In step 402, the system also creates a user based on the information contained in the template.

In step 403, the system defines an access key for the user identity. In accordance with an embodiment, the access key can be a combination of an access key identifier and a secret key used to securely identify the user. Once the user access key has been defined, it is securely stored on the system. For example, it may be encrypted using various methods well known in the art.

In step 404, when parsing the access file, the system may detect a parameter that opaquely references the user access key by referring to the "user access key" attribute of the user. The reference is opaque in a sense that it references a particular property or attribute of the user, rather than specifying the actual text string of the access key. Thus, any person or program that may read the template will not be able to ascertain the actual string value of the access key referred therein.

In step 405, the system determines which resource(s) is instructed to receive the access key by the template. For example, a client may have specified that the compute node that is created in the stack should receive a copy of the user access key.

In step 406, the system can receive requests for the user access key from various resources. For example, a compute node may request the user access key from the system in order to authenticate a particular entity or authorize an action.

In step 407, the system securely provides the access key to the resources that were instructed to receive it in the template. Following the example above, the system would provide a copy of the access key to the compute node and the compute node can subsequently use the access key to authenticate any person that tries to log into it.

Figure 5:
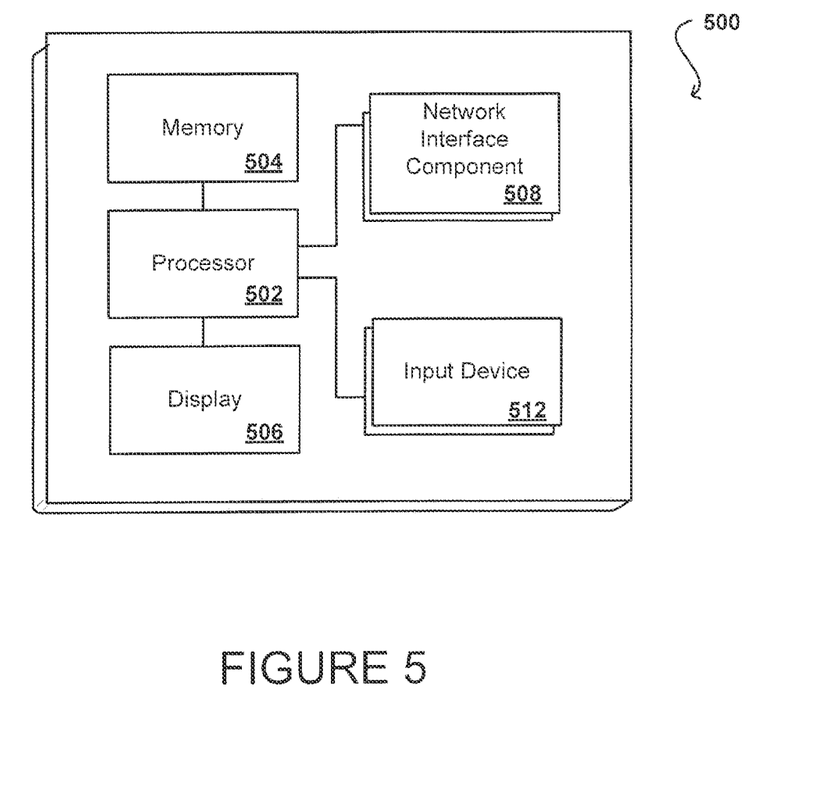
FIG. 5 illustrates a logical arrangement of a set of general components of an example computing device.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one input element 508 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 500 of FIG. 5 can include one or more network interface elements 508 for communicating over various networks, such as a Wi-Fi, Bluetooth, RF, wired, or wireless communication systems. The device in many embodiments can communicate with a network, such as the Internet, and may be able to communicate with other such devices.

Figure 6:
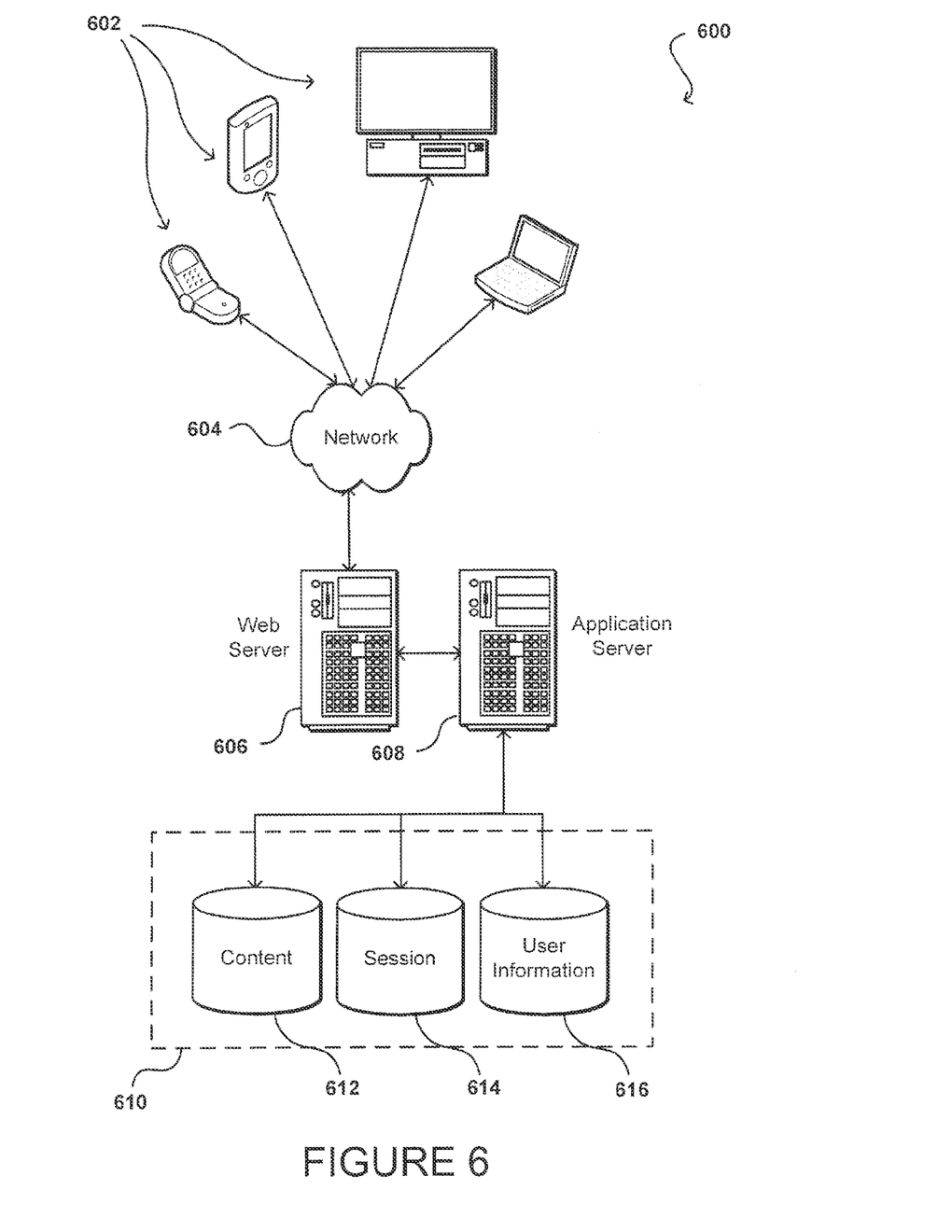
FIG. 6 illustrates an example of an environment for implementing aspects in accordance with various embodiments.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for template representation of security resources, said method, comprising:
    under the control of one or more computer systems configured with executable instructions,
    reading a template that defines a stack of resources and specifies a set of dependencies between the resources, the template referencing at least one security resource including at least one of: a user identity, a group, or a policy; and
    creating a stack of resources based on the template, said creating further including at least the steps of:
    causing the policy to be created based at least in part on the template, the policy specifying a set of permissions for performing one or more actions; and
    attaching the policy to a user identity based at least in part on the security resource referenced in the template, the user identity being associated with a user access key, wherein being associated includes the template referencing the user access key, and wherein referencing includes referring to an attribute of the user identity;
    receiving a request for the user access key from at least one resource, wherein the at least one resource is a resource of the stack of resources defined by the template, a resource of a different stack, or an external resource; and
    for resources that are instructed in the template to receive the user access key, providing the at least one resource with the user access key.

2. The computer implemented method of claim 1, further comprising:
    creating a group based on the security resource specified in the template; and
    associating the user identity with the group.

3. The computer implemented method of claim 1, further comprising:
    instantiating a compute node based on the template, the compute node providing the network-accessible service; and
    associating the compute node with the user identity.

4. The computer implemented method of claim 3, further comprising:
    instantiating a database instance that stores data processed by the compute node in providing the network-accessible service.

5. The computer implemented method of claim 3, wherein the compute node is provided with the user access key associated with the user identity.

6. A computing device comprising:
    a storage memory storing a set of instructions for template representation of security resources; and
    one or more hardware processors configured by the set of instructions to:
    read or receive a template that defines a stack of resources and specifies a set of dependencies between the resources, the template defining one or more of: a user identity, a group or a policy; and
    create a stack of resources based on the template, wherein to create the stack of resources the one or more hardware processors are configured to:
    create a user identity based at least in part on the template and associated with the stack of resources, the user identity being associated with a user access key, wherein being associated includes the template referencing the user access key, and wherein referencing includes referring to an attribute of the user identity;

receive the policy from an identity management service, the policy specifying a set of permissions for performing one or more actions; and attach the policy to the user identity referenced in the template;

receive a request for the user access key from at least one resource, wherein the at least one resource is a resource of the stack of resources defined by the template, a resource of a different stack, or an external resource; and for resources that are instructed in the template to receive the user access key, provide the at least one resource with the user access key.

7. The computing device of claim 6, further comprising instructions that configure the one or more processors to:

create a group based at least in part on the template; and associate the user identity with the group.

8. The computing device of claim 6, further comprising instructions that configure the one or more processors to:

instantiate a compute node based at least in part on the template, the compute node providing the network-accessible service; and associate the compute node with the user identity.

9. The computing device of claim 8, further comprising instructions that configure the one or more processors to:

instantiate a database instance that stores data processed by the compute node in providing the network-accessible service.

10. A non-transitory computer readable storage medium storing one or more sequences of instructions executable by one or more processors to perform a set of steps for template representation of security resources, the set of steps comprising:

reading a template that defines a stack of resources and specifies a set of dependencies between the resources, and references at least one security resource, the security resource including at least one of: a customer identity, a group or a policy; and creating a stack of resources based on the template, said creating further including at least the steps of:

causing the policy to be created based at least in part on the template, the policy specifying a set of permissions for performing one or more actions; and attaching the policy to a customer identity based at least in part on the security resource referenced in the template, the customer identity being associated with an access key, and wherein being associated includes the template referencing the access key, referencing including referring to an attribute of the customer identity;

receiving a request for the access key from at least one resource, wherein the at least one resource is a resource of the stack of resources defined by the template, a resource of a different stack, or an external resource; and for resources that are instructed in the template to receive the user access key, providing the at least one resource with the access key.

11. The non-transitory computer readable storage medium of claim 10, wherein the policy is created by invoking an identity management service.

12. The non-transitory computer readable storage medium of claim 10, further comprising:

creating a group based on the security resource specified in the template; and associating the customer identity with the group.

13. The non-transitory computer readable storage medium of claim 10, further comprising:

instantiating a compute node based on the template, the compute node providing the network-accessible service; and associating the compute node with the customer identity.

14. The non-transitory computer readable storage medium of claim 13, further comprising:

instantiating a database instance that stores data processed by the compute node in providing the network-accessible service.

* * * * *